United States Patent
Koike et al.

(10) Patent No.: US 11,005,146 B2
(45) Date of Patent: May 11, 2021

(54) BATTERY AND BATTERY MANUFACTURING METHOD

(71) Applicant: TOYOTA JIDOSHA KABUSHIKI KAISHA, Toyota (JP)

(72) Inventors: Masaki Koike, Nagoya (JP); Yoshinori Shibata, Nagoya (JP); Kaoru Ito, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 16/263,893

(22) Filed: Jan. 31, 2019

(65) Prior Publication Data

US 2019/0237740 A1 Aug. 1, 2019

(30) Foreign Application Priority Data

Feb. 1, 2018 (JP) .............................. JP2018-016809

(51) Int. Cl.
| | |
|---|---|
| *H01M 50/572* | (2021.01) |
| *H01M 50/543* | (2021.01) |
| *H01M 50/531* | (2021.01) |
| *H01M 50/528* | (2021.01) |
| *H01M 50/172* | (2021.01) |
| *H01M 50/15* | (2021.01) |
| *H01M 10/05* | (2010.01) |
| *H01M 10/04* | (2006.01) |

(52) U.S. Cl.
CPC ....... *H01M 50/543* (2021.01); *H01M 10/049* (2013.01); *H01M 10/05* (2013.01); *H01M 50/15* (2021.01); *H01M 50/172* (2021.01); *H01M 50/528* (2021.01); *H01M 50/531* (2021.01)

(58) Field of Classification Search
None
See application file for complete search history.

(56) References Cited

U.S. PATENT DOCUMENTS

| | | | | | |
|---|---|---|---|---|---|
| 4,523,068 | A | * | 6/1985 | Lund | ................... H01M 50/561 219/633 |
| 8,367,242 | B2 | * | 2/2013 | Byun | .................. H01M 50/148 429/178 |

(Continued)

FOREIGN PATENT DOCUMENTS

| | | |
|---|---|---|
| JP | 55-122694 A | 9/1980 |
| JP | 2014-011073 A | 1/2014 |

(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

A battery includes a case, an internal terminal, an external terminal, and an insulator. The internal terminal includes an internal terminal base and a shaft. The internal terminal base is disposed inside the case, with the insulator interposed between the case and the internal terminal base. The external terminal includes an external terminal base and a boss. The external terminal base is disposed outside the case, with the insulator interposed between the external terminal base and the case. The boss extends from the external terminal base. The boss receives the shaft of the internal terminal therethrough. The boss is pressure-welded to the shaft of the internal terminal.

10 Claims, 9 Drawing Sheets

(56) References Cited

U.S. PATENT DOCUMENTS

| | | | | |
|---|---|---|---|---|
| 2013/0273415 A1* | 10/2013 | Lee | ............... | H01M 2/021 |
| | | | | 429/176 |
| 2013/0273416 A1* | 10/2013 | Masuda | ............ | H01M 2/06 |
| | | | | 429/179 |
| 2014/0004408 A1 | 2/2014 | Ehara | | |
| 2015/0118546 A1* | 4/2015 | Nakayama | ............ | H01M 10/04 |
| | | | | 429/179 |
| 2018/0226627 A1* | 8/2018 | Shiohama | ............ | H01R 11/283 |

FOREIGN PATENT DOCUMENTS

| | | | |
|---|---|---|---|
| JP | 2016-100323 A | 5/2016 | |
| JP | 2017-134910 A | 8/2017 | |

\* cited by examiner

BATTERY AND BATTERY MANUFACTURING METHOD

CROSS-REFERENCE TO RELATED APPLICATIONS

This application claims the benefit of priority to Japanese Patent Application No. 2018-016809 filed on Feb. 1, 2018. The entire contents of this application are incorporated herein by reference.

BACKGROUND

The present disclosure relates to batteries and battery manufacturing methods.

JP 2016-100323 A discloses a battery and a battery manufacturing method. The battery disclosed in JP 2016-100323 A includes: a battery case; an internal terminal disposed inside the battery case; and an external terminal. The internal terminal and the external terminal are swaged together. The battery case is provided with a through hole. The internal terminal includes a shaft inserted through the through hole. At a location outside the battery case, the external terminal is fitted to the shaft of the internal terminal. The shaft of the internal terminal includes an end swaged to the external terminal. This provides a rivet-like structure in which the internal terminal and the external terminal are connected to each other, with the battery case located between a base of the internal terminal and a portion of the internal terminal swaged to the external terminal.

The battery disclosed in JP 2014-11073 A includes: an internal terminal including a shaft; and an external terminal. The shaft of the internal terminal includes an end swaged to the external terminal. The peripheral edge of the end of the shaft of the internal terminal is welded to the external terminal. Welding the internal terminal to the external terminal enhances the conductivity between the internal terminal and the external terminal.

JP 55-122694 A discloses an "electromagnetic welding method".

SUMMARY

The rivet-like structure in which the end of the shaft of the internal terminal is swaged to the external terminal makes it necessary to bring a swaging jig into contact with the internal terminal such that portions of the internal terminal and the external terminal to be swaged together are sandwiched between the swaging jig and the battery case. An electrode body is thus attached to the internal terminal after the internal terminal is attached to the battery case. Increasing the current flowing through a battery may involve increasing the diameter of the shaft of the internal terminal in order to reduce electrical resistance. The increase in the diameter of the shaft of the internal terminal, however, increases the strength of the shaft of the internal terminal, making it difficult to swage the end of the shaft of the internal terminal.

An embodiment of the present disclosure provides a battery including a case, an electrode body, an internal terminal, an external terminal, and at least one insulator. The case includes a terminal insertion hole. The electrode body is housed in the case. The internal terminal is attached to the electrode body and at least partially disposed inside the case. The external terminal is disposed outside the case. The insulator is disposed between the case and the internal terminal and between the case and the external terminal.

The internal terminal includes an internal terminal base and a shaft. The internal terminal base is disposed inside the case, with the insulator interposed between the internal terminal base and the case. The shaft extends from the internal terminal base. The shaft is disposed through the terminal insertion hole.

The external terminal includes an external terminal base and a boss. The external terminal base is disposed outside the case, with the insulator interposed between the external terminal base and the case. The boss extends from the external terminal base. The boss receives the shaft of the internal terminal therethrough. The boss is pressure-welded to the shaft of the internal terminal.

The expression "the boss of the external terminal is pressure-welded to the shaft of the internal terminal" refers to a state where the boss of the external terminal is at least partially press-fitted to the shaft of the internal terminal, and atoms of the boss and the shaft are bonded to each other.

Because the boss of the external terminal is pressure-welded to the shaft of the internal terminal, the battery according to this embodiment enables an increase in the diameter of the shaft of the internal terminal and provides conductivity between the internal terminal and the external terminal.

The shaft of the internal terminal may have a deformation mark of plastic deformation that axially pulls the shaft toward outside of the case.

An outer peripheral surface of the shaft may be provided with protrusions and recesses. The boss may be provided with a slit extending in a circumferential direction of the boss. The external terminal base may be provided with a slit extending around the boss.

Another embodiment of the present disclosure provides a battery manufacturing method including the steps of: a) preparing a case component; b) preparing an internal terminal; c) preparing an external terminal; d) assembling the internal terminal to the case component; e) assembling the external terminal to the case component and the internal terminal; and f) performing pressure welding.

Step a) involves preparing the case component including a terminal insertion hole. Step b) involves preparing the internal terminal including an internal terminal base and a shaft extending upward from the internal terminal base. The shaft is insertable through the terminal insertion hole.

Step c) involves preparing the external terminal including an external terminal base and a boss extending upward from the external terminal base. The boss receives the shaft therethrough.

Step d) involves assembling the internal terminal to the case component such that the shaft is inserted through the terminal insertion hole, with an insulator interposed between the case component and the internal terminal base, and the internal terminal base is disposed inside the case component.

Step e) involves assembling the external terminal to the case component and the internal terminal such that the boss is fitted to the shaft inserted through the terminal insertion hole, with the insulator interposed between the external terminal base and the case component, and the external terminal base is disposed outside the case component.

Step f) involves disposing a coil including an electric wire wound around the boss, and passing a current through the coil such that a radially inward force is exerted on the boss so as to deform the boss radially inward and pressure-weld the boss to the shaft of the internal terminal.

In this embodiment, the passage of the current through the coil produces a force to deform the boss radially inward, and this force is exerted on the boss so as to pressure-weld the boss to the shaft of the internal terminal. Because the boss is pressure-welded to the shaft of the internal terminal on the same principle as electromagnetic welding, the boss is swaged radially, and conductivity between the internal terminal and the external terminal is provided with reliability. The internal terminal is thus attachable to the case even after the electrode body is attached to the internal terminal.

Step f) may involve passing the current through the coil, with the shaft pulled upward and the external terminal pressed downward. This more reliably provides airtightness around the shaft of the internal terminal.

Step f) may involve disposing a first restrictor to restrict deformation of the shaft. The first restrictor may be disposed above the shaft. Step f) may involve disposing a second restrictor to restrict deformation of the insulator. The second restrictor may be disposed around the insulator. Step f) may involve disposing a third restrictor to restrict deformation of the external terminal base. The third restrictor may be disposed on the external terminal base.

DETAILED DESCRIPTION

Batteries and battery manufacturing methods according to various embodiments of the present disclosure will be described below. The embodiments described below are naturally not intended to limit the present invention in any way. Unless otherwise specified, the present invention is not limited to the embodiments described below. The drawings are depicted schematically and do not necessarily reflect actual objects. The features and components that exhibit the same effects are denoted by the same reference signs as appropriate, and the description thereof will not be repeated. The reference signs may be omitted in detailed illustrations.

Figure 1:
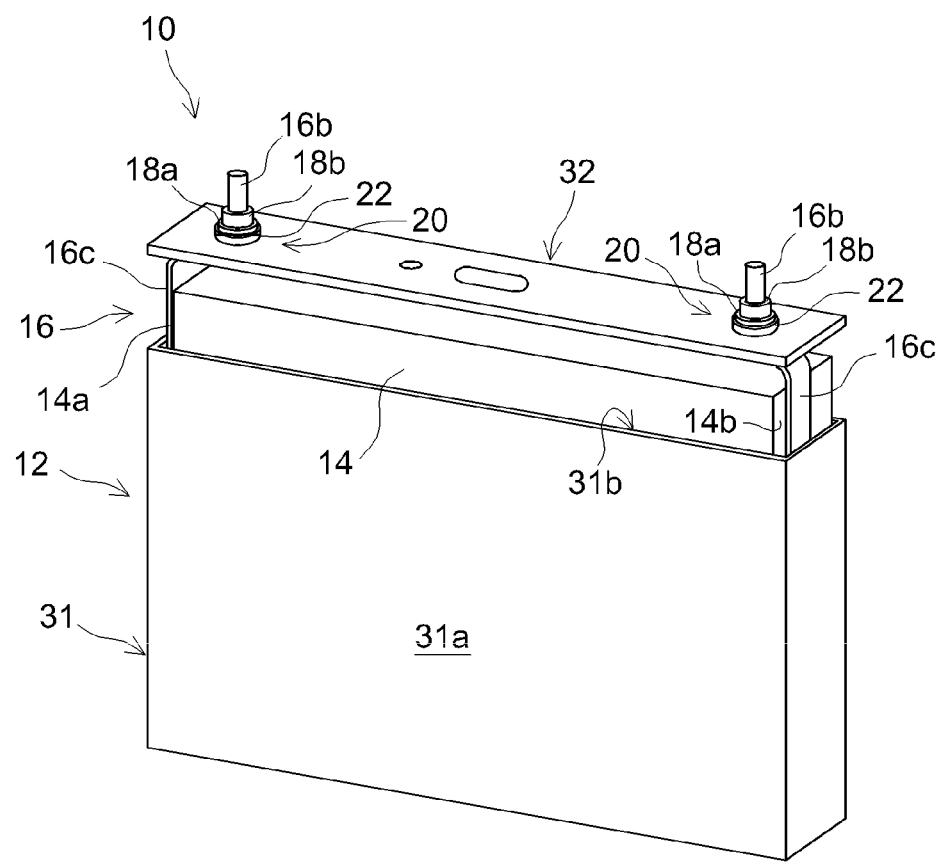
FIG. 1 is a perspective view of a battery 10.
Figure 2:
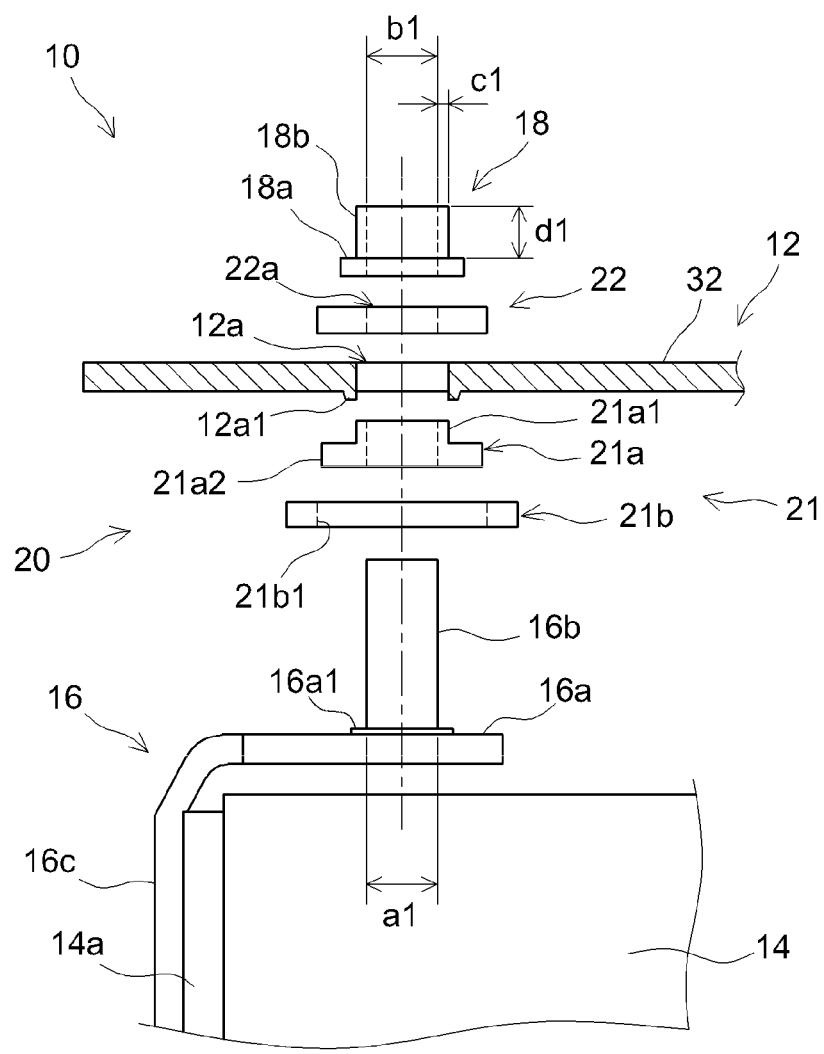
FIG. 2 is an exploded view of a terminal assembly of the battery 10.
Figure 3:
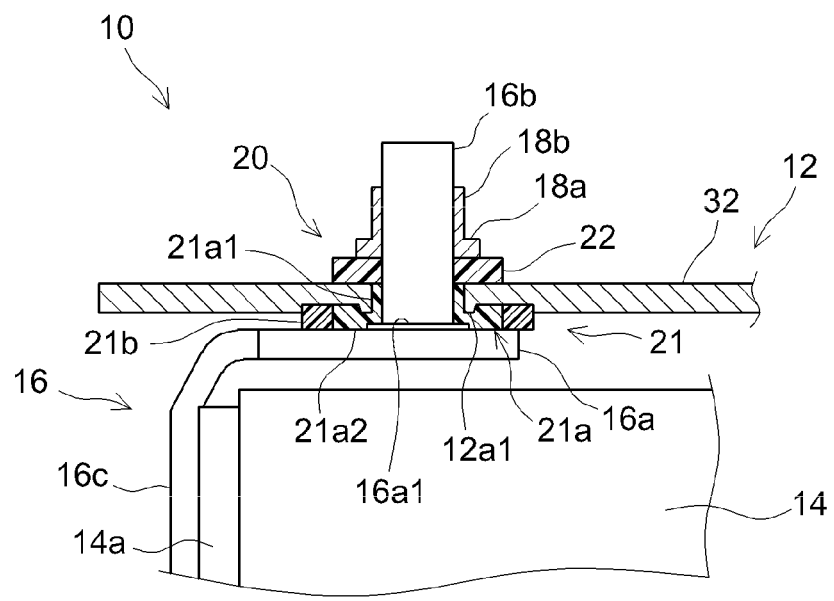
FIG. 3 is a cross-sectional view of the terminal assembly of the battery 10 in an assembled condition.

FIG. 1 is a perspective view of a battery 10. FIG. 2 is an exploded view of a terminal assembly of the battery 10. FIG. 3 is a cross-sectional view of the terminal assembly of the battery 10 in an assembled condition.

As illustrated in FIGS. 1 and 2, the battery 10 includes a case 12, an electrode body 14, internal terminals 16, external terminals 18, and insulators 20. In the present embodiment, each insulator 20 includes a gasket 21 and an insulating member 22.

The case 12 houses the electrode body 14. As illustrated in FIG. 1, the case 12 is a rectangular case that includes a pair of wide surfaces 31a facing each other and defines a housing region having a flat, substantially cuboid shape. The case 12 includes a case body 31 and a lid 32. The case body 31 has a substantially cuboid shape. One of lateral surfaces of the case body 31 includes an opening 31b. The electrode body 14 is housed in the housing region of the case 12 through the opening 31b. The lid 32 is a substantially plate-shaped member fitted to the opening 31b of the case body 31.

The case 12 includes terminal insertion holes 12a. Electrode terminals are each attached to the case 12 through the terminal insertion holes 12a. The terminal insertion holes 12a pass through the case 12. In the present embodiment, the terminal insertion holes 12a are provided in the lid 32. The edge of each terminal insertion hole 12a is provided with a protrusion 12a1 protruding inward from the lid 32.

In the present embodiment, the case 12 includes two terminal insertion holes 12a each provided in an associated one of the ends of the lid 32 so as to attach a positive electrode terminal and a negative electrode terminal to the case 12. The case body 31 and the lid 32 are each preferably made of aluminum or an aluminum alloy, such as 1000 series aluminum or 3000 series aluminum.

The electrode body 14 is housed in the case 12, with the electrode body 14 covered with, for example, an insulating film (not illustrated). Although not illustrated, the electrode body 14 includes a positive electrode sheet, a negative electrode sheet, and separator sheets. The positive electrode sheet is a positive electrode element. The negative electrode sheet is a negative electrode element. Each separator sheet is a separator.

In one example, the positive electrode sheet includes: a positive electrode collector foil (which is aluminum foil in the present embodiment) having predetermined width and thickness; a positive electrode active material layer containing a positive electrode active material; and a positive electrode active material layer-free portion having a constant width. The positive electrode active material layer-free portion is defined on an end of the positive electrode collector foil located on one side in the width direction of the positive electrode collector foil. The positive electrode active material layer is defined on both surfaces of the positive electrode collector foil except the positive electrode active material layer-free portion. For a lithium ion secondary battery, examples of the positive electrode active material include a lithium transition metal composite material that is capable of releasing lithium ions during charging and absorbing lithium ions during discharge. Examples of the positive electrode active material include various generally known materials in addition to such a lithium transition metal composite material. The positive electrode active material is thus not limited to any particular material.

In one example, the negative electrode sheet includes: a negative electrode collector foil (which is copper foil in the present embodiment) having predetermined width and thickness; a negative electrode active material layer containing a negative electrode active material; and a negative electrode active material layer-free portion having a constant width. The negative electrode active material layer-free portion is defined on an end of the negative electrode collector foil located on one side in the width direction of the negative electrode collector foil. The negative electrode active material layer is defined on both surfaces of the negative electrode collector foil except the negative electrode active material layer-free portion. For a lithium ion secondary battery, examples of the negative electrode active material include natural graphite that is capable of storing lithium ions during charging and releasing the lithium ions during discharge. Examples of the negative electrode active material include various generally known materials in addition to such natural graphite. The negative electrode active material is thus not limited to any particular material.

Examples of the separator sheets to be used include a porous resin sheet that has required heat resistance and allows an electrolyte to pass therethrough. Examples of the separator sheets include various other sheets. The separator sheets are thus not limited to any particular type of sheet.

The positive electrode active material layer-free portion of the positive electrode collector foil and the negative electrode active material layer-free portion of the negative electrode collector foil face in the opposite directions in the width direction of the electrode body 14. The separator sheets include a first separator sheet and a second separator sheet. The negative electrode active material layer covers the positive electrode active material layer, with the first separator sheet interposed between the negative electrode active material layer and the positive electrode active material layer. The negative electrode active material layer is covered with the second separator sheet. The positive electrode active material layer-free portion of the positive electrode collector foil is protruded beyond a first end of each separator sheet in the width direction thereof. The negative electrode active material layer-free portion of the negative electrode collector foil is protruded beyond a second end of each separator sheet in the width direction thereof. The second end of each separator sheet is located opposite to the first end of each separator sheet in the width direction of the electrode body 14. As illustrated in FIG. 1, the electrode body 14 is housed in the case body 31. The positive electrode active material layer-free portion of the positive electrode collector foil is located on one side in the width direction of the electrode body 14. The negative electrode active material layer-free portion of the negative electrode collector foil is located opposite to the positive electrode active material layer-free portion of the positive electrode collector foil in the width direction of the electrode body 14. The positive electrode active material layer-free portion of the positive electrode collector foil will be referred to as a "first collector 14a". The negative electrode active material layer-free portion of the negative electrode collector foil will be referred to as a "second collector 14b".

The electrode body 14 is not limited to the structure described above. Alternatively, the electrode body 14 may be a battery element to provide an all-solid-state battery including a solid electrolyte interposed between the positive electrode active material layer and the negative electrode active material layer.

The internal terminals 16 are attached to the electrode body 14. The internal terminals 16 are mounted inside the case 12.

Each internal terminal 16 includes an internal terminal base 16a, a shaft 16b, and an attaching member 16c.

The internal terminal base 16a is disposed inside the case 12, with the insulator 20 interposed between the internal terminal base 16a and the case 12. The shaft 16b extends from the internal terminal base 16a. The shaft 16b is inserted through the terminal insertion hole 12a.

Each insulator 20 is disposed between the case 12 and the associated internal terminal 16 and between the case 12 and the associated external terminal 18. Each insulator 20 may consist of a single member.

In the present embodiment, each insulator 20 includes the gasket 21 and the insulating member 22. The gasket 21 and the insulating member 22 are each made of insulating resin.

Each gasket 21 is disposed between the case 12 and the associated internal terminal 16 inside the case 12. In the present embodiment, each gasket 21 disposed inside the case 12 includes a first gasket 21a and a second gasket 21b. The first gasket 21a includes a boss 21a1 and a base 21a2. The boss 21a1 is fitted to the associated terminal insertion hole 12a. The boss 21a1 is a sleeve through which the shaft 16b of the associated internal terminal 16 is inserted. The base 21a2 is a flat plate extending radially outward from the base end of the boss 21a1. The second gasket 21b is a flat plate including a hole 21b1. The base 21a2 of the first gasket 21a is fitted into the hole 21b1. The first gasket 21a is thus surrounded by the second gasket 21b. The first gasket 21a and the second gasket 21b of each gasket 21 may be integral with each other.

Each insulating member 22 is disposed between the case 12 and the associated external terminal 18 outside the case 12. Each insulating member 22 has a substantially flat plate shape. Each insulating member 22 is provided with an insertion hole 22a. The shaft 16b of the associated internal terminal 16 is inserted through the insertion hole 22a.

Each external terminal 18 is disposed outside the case 12. Each external terminal 18 includes an external terminal base 18a and a boss 18b.

The external terminal base 18a is disposed outside the case 12, with the insulator 20 interposed between the external terminal base 18a and the case 12. The boss 18b extends from the external terminal base 18a. The shaft 16b of the associated internal terminal 16 is inserted through the boss 18b.

As illustrated in FIG. 3, the battery 10 includes the gaskets 21 each fitted to the shaft 16b of the associated internal terminal 16. The shaft 16b of each internal terminal 16, to which the associated gasket 21 is fitted, is inserted through the associated terminal insertion hole 12a from inside the lid 32. At a location outside the lid 32, each insulating member 22 is fitted to the shaft 16b of the associated internal terminal 16. Each external terminal 18 is mounted on the associated insulating member 22. The boss 18b of each external terminal 18 is fitted to the shaft 16b of the associated internal terminal 16. Specifically, the boss 18b of each external terminal 18 is pressure-welded to the shaft 16b of the associated internal terminal 16.

The present embodiment involves generating a magnetic field and an induced electromotive force that cause the boss 18b of each external terminal 18 to deform radially inward. The boss 18b of each external terminal 18 is thus pressure-welded to the shaft 16b of the associated internal terminal 16. The following description discusses how the boss 18b of each external terminal is deformed and pressure-welded to the shaft 16b of the associated internal terminal 16.

Figure 4:
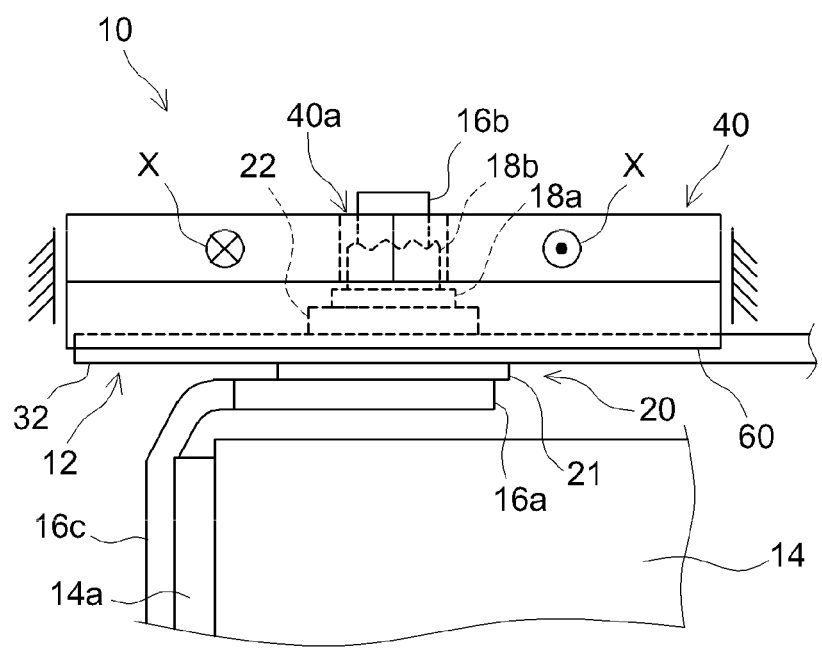
FIG. 4 is a front view of the terminal assembly of the battery 10, illustrating a manufacturing step for assembling the terminal assembly.
Figure 5:
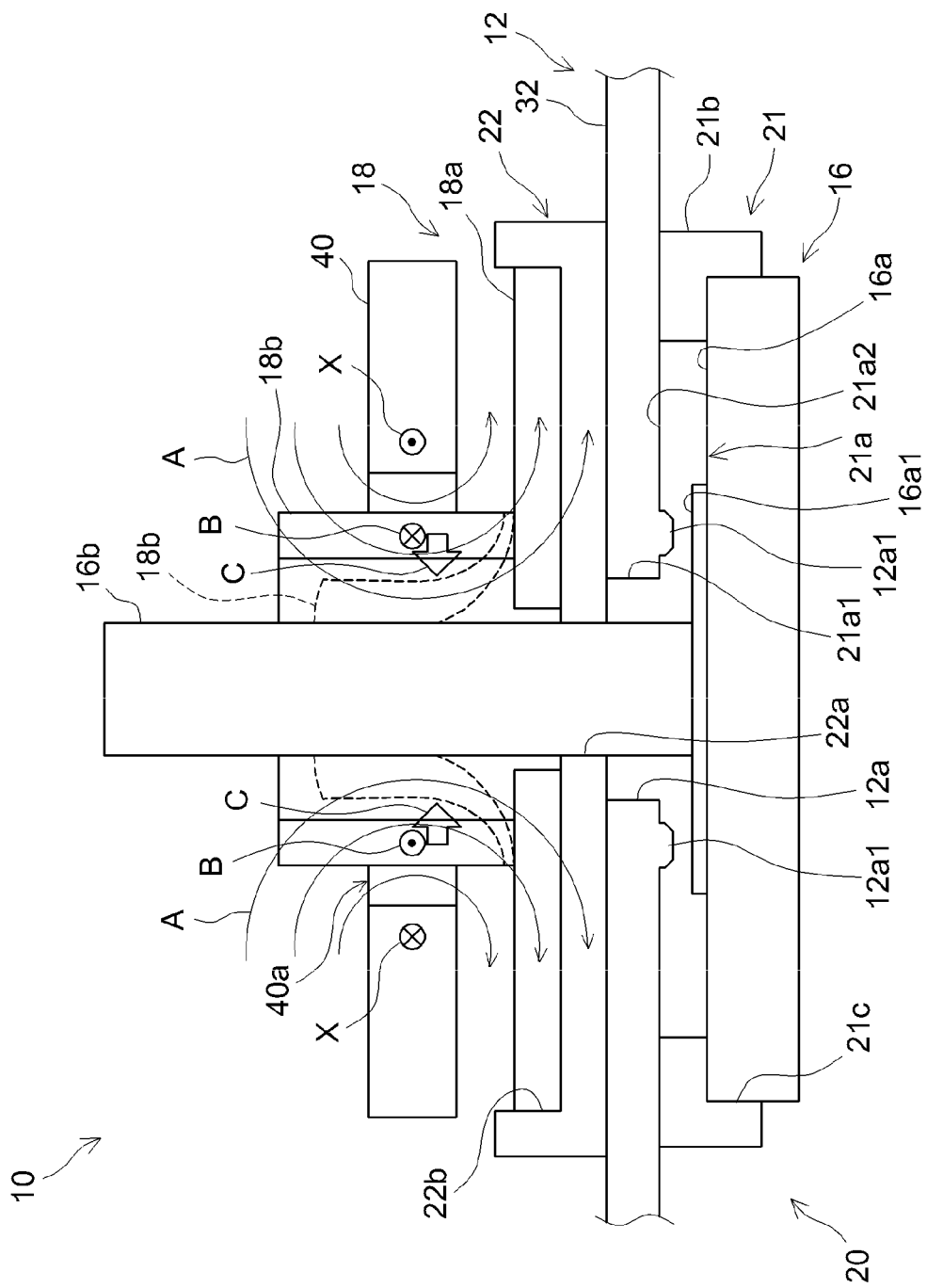
FIG. 5 is a schematic diagram of the terminal assembly of the battery 10, illustrating a manufacturing step for assembling the terminal assembly.
Figure 6:
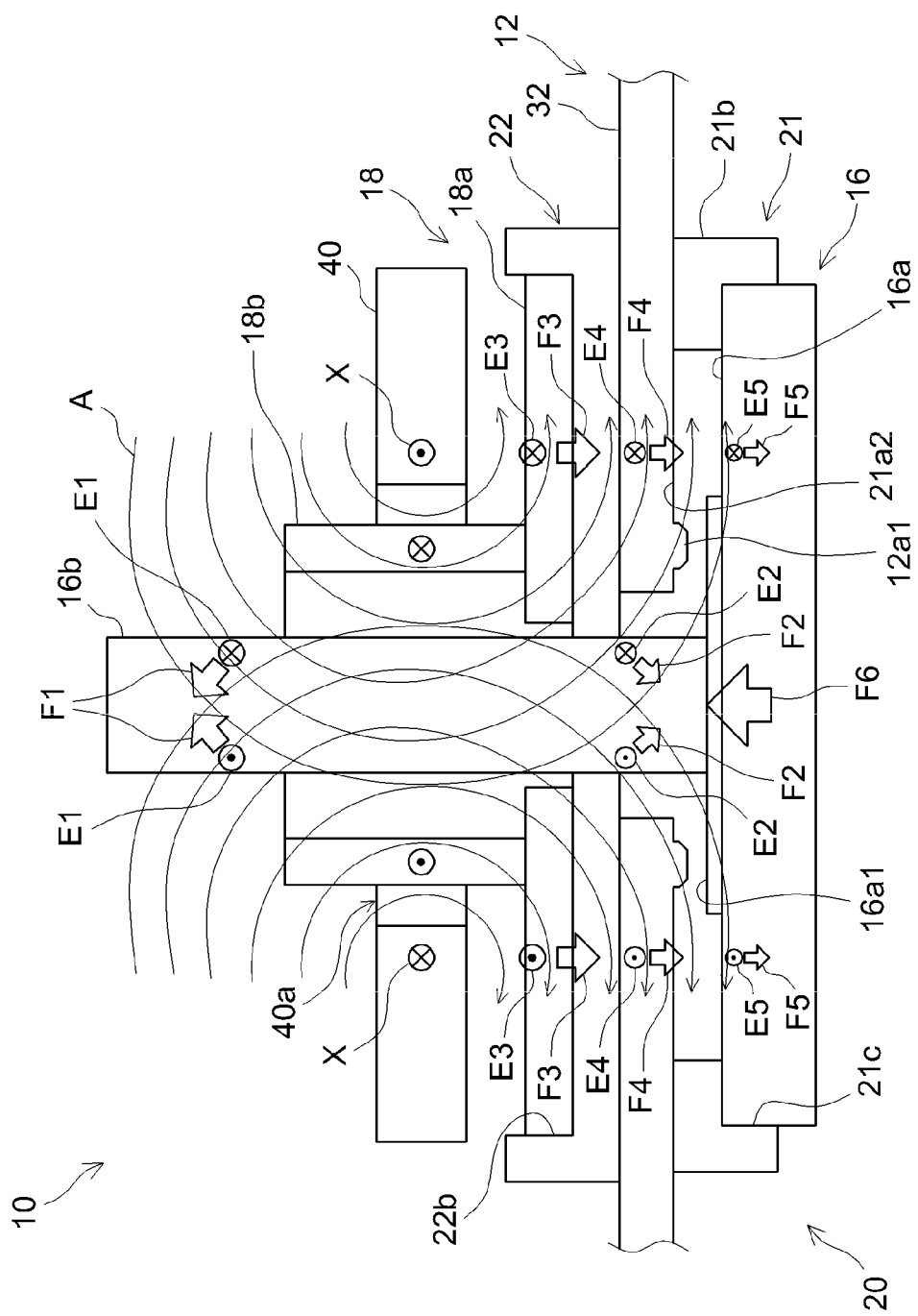
FIG. 6 is a schematic diagram of the terminal assembly of the battery 10, illustrating a manufacturing step for assembling the terminal assembly.

FIG. 4 is a front view of the terminal assembly of the battery 10, illustrating a manufacturing step for assembling the terminal assembly. FIGS. 5 and 6 are schematic diagrams of the terminal assembly of the battery 10, each illustrating a manufacturing step for assembling the terminal assembly.

As illustrated in FIG. 3, the shaft 16b of the internal terminal 16 is inserted through the gasket 21, the terminal insertion hole 12a of the lid 32, the insulating member 22, and the external terminal 18, such that the internal terminal 16, the gasket 21, the insulating member 22, and the external terminal 18 are assembled into the terminal assembly of the battery 10. As illustrated in FIG. 4, an insulator 60 is mounted on the lid 32. A coil 40 is disposed on the insulator 60. The coil 40 includes an electric wire wound around the boss 18b. In the present embodiment, the coil 40 is a "one-turn" coil. Specifically, the coil 40 is an annular coil made of a conductor having a substantially flat plate shape. The coil 40 defines a hole 40a through which the boss 18b of the external terminal 18 is insertable. When viewed from outside the lid 32 (i.e., when viewed from above the lid 32), a current is passed through the coil 40 in the clockwise direction.

FIG. 5 illustrates: the direction of a current X passing through the coil 40; the direction of a magnetic field A generated by the coil 40; the direction of an induced current B generated in the boss 18b; and the direction of a force C exerted on the boss 18b. The magnetic field A, the induced current B, and the force C are generated during the passage of the current X through the coil 40.

As illustrated in FIG. 5, the current X passes through the coil 40 in the clockwise direction as viewed from outside the lid 32 (i.e., from above the lid 32). During the passage of the current X through the coil 40, the magnetic field A is generated around the electric wire of the coil 40 such that the magnetic field A passes through the center of the coil 40 from above the coil 40 to below the coil 40. In the vicinity of the boss 18b, the magnetic field A is generated such that the magnetic field A passes through the boss 18b from above the boss 18b to below the boss 18b around the current X. The passage of the current X through the coil 40 generates the induced current B in the boss 18b of the external terminal 18 such that the induced current B flows in the counterclockwise direction as viewed from outside the lid 32 (i.e., from above the lid 32). In accordance with Fleming's left-hand rule, the induced current B generated in the boss 18b by the passage of the current X through the coil 40 and the magnetic field A passing through the boss 18b exert the force C that deforms the boss 18b radially inward. The passage of the current X through the coil 40 thus produces the force C that deforms the boss 18b of the external terminal 18 radially inward as indicated by the dashed lines in FIG. 5. The current X of a required magnitude is preferably passed through the coil 40 such that the boss 18b is forcibly deformed and thus pressure-welded to the shaft 16b of the internal terminal 16.

Pressure-welding the boss 18b of the external terminal 18 to the shaft 16b of the internal terminal 16 provides required conductivity between the external terminal 18 and the internal terminal 16. If the boss 18b of the external terminal 18 is deformed merely by a mechanical force, the boss 18b of the external terminal 18 will not be pressure-welded to the shaft 16b of the internal terminal 16. In other words, merely mechanically deforming the boss 18b of the external terminal 18 fails to cause metal atoms to bond to each other. This makes it impossible to provide sufficient conductivity between the external terminal 18 and the internal terminal 16.

FIG. 6 illustrates: the direction of the current X passing through the coil 40; the direction of the magnetic field A generated by the coil 40; the direction of an induced current E1 generated in the shaft 16b of the internal terminal 16; the direction of an induced current E2 generated in the base end of the shaft 16b of the internal terminal 16; the direction of an induced current E3 generated in the external terminal base 18a of the external terminal 18; the direction of an induced current E4 generated in the lid 32; the direction of an induced current E5 generated in the internal terminal base 16a of the internal terminal 16; the directions of forces F1 and F2 exerted on the shaft 16b of the internal terminal 16; the direction of a force F3 exerted on the external terminal base 18a of the external terminal 18; the direction of a force F4 exerted on the lid 32; the direction of a force F5 exerted on the internal terminal base 16a of the internal terminal 16; and the direction of a resultant force F6 exerted on the internal terminal 16. The magnetic field A, the induced currents E1 to E5, and the forces F1 to F6 are generated during the passage of the current X through the coil 40.

The induced currents E1 to E5 and the forces F1 to F5 tend to increase in magnitude as their distances from the coil 40 decreases, and tend to decrease in magnitude as their distances from the coil 40 increases. The resultant force F6 is thus exerted on the internal terminal 16 in an upward direction. In contrast, downward forces are exerted on the external terminal base 18a of the external terminal 18 and the lid 32. When necessary, a magnetic force attenuation plate, for example, may be disposed such that the resultant force F6 is exerted on the internal terminal 16 in the upward direction and downward forces are exerted on the external terminal base 18a of the external terminal 18 and the lid 32.

The gasket 21 is thus sandwiched between the lid 32 on which the downward force F4 is exerted and the internal terminal on which the upward resultant force F6 is exerted. This strongly presses the internal terminal base 16a of the internal terminal 16 against the gasket 21. The protrusion 12a1 on the peripheral edge of the terminal insertion hole 12a of the lid 32 is forced into the base 21a2 of the gasket 21. The gasket 21 thus provides high airtightness between the internal terminal 16 and the lid 32 around the terminal insertion hole 12a and the shaft 16b of the internal terminal 16. The force F3 exerted on the external terminal base 18a of the external terminal 18 presses the external terminal 18 against the insulating member 22. Upon receiving the force F1, the shaft 16b of the internal terminal 16 is pulled upward. In this state, the boss 18b of the external terminal 18 is deformed radially inward and thus pressure-welded to the shaft 16b of the internal terminal 16 as illustrated in FIG. 5.

In the pressure welding step, the current X may be passed through the coil 40, with the shaft 16b of the internal terminal 16 pulled upward and the external terminal 18 pressed downward. Specifically, the shaft 16b of the internal terminal 16 may be pulled upward and the external terminal 18 is pressed downward, so that the protrusion 12a1 on the peripheral edge of the terminal insertion hole 12a of the lid 32 is sufficiently forced into the base 21a2 of the gasket 21 disposed between the lid 32 and the internal terminal 16.

Pulling the shaft 16b of the internal terminal 16 upward and pressing the external terminal 18 downward causes the gasket 21 (which is a component of the insulator 20) to be caught between the lid 32 and the internal terminal 16. The gasket 21 caught between the internal terminal 16 and the lid 32 more reliably provides airtightness between the internal terminal 16 and the lid 32 around the terminal insertion hole 12a. In this state, the current X is passed through the coil 40 so as to deform the boss 18b radially inward and pressure-weld the boss 18b to the shaft 16b. This provides and maintains airtightness not only between the internal terminal 16 and the lid 32 buy also between the internal terminal 16 and the external terminal 18. In one example, the process of pulling the shaft 16b of the internal terminal 16 upward may involve cutting a thread on the shaft 16b of the internal terminal 16, attaching a nut to the shaft 16b, and pulling the nut attached to the shaft 16b. In another example, the process of pulling the shaft 16b of the internal terminal 16 upward may involve pulling the shaft 16b of the internal terminal 16, with the shaft 16b held with a collet chuck, for example.

As described above, the present embodiment involves generating a magnetic field and an induced electromotive force that cause the boss 18b of the external terminal 18 to be pressure-welded to the shaft 16b of the internal terminal 16. The dimensions of the boss 18b, such as the protrusion length, inner diameter, and thickness of the boss 18b, are preferably adjusted such that the boss 18b is suitably deformed by the above-described pressure welding step. In one example, the shaft 16b of the internal terminal 16 may have a diameter of between 3 mm and 8 mm inclusive. In one example, the boss 18b is preferably protruded from the external terminal base 18a by at least 5 mm or more. The height of the boss 18b from the external terminal base 18a is preferably 15 mm or less, for example. The boss 18b preferably has an inner diameter slightly larger than the outer diameter of the shaft 16b of the internal terminal 16. In one example, an average circumferential clearance between the shaft 16b of the internal terminal 16 and the boss 18b of the external terminal 18 is preferably between about 0.5 mm and about 2.5 mm. In other words, the difference between the inner diameter of the boss 18b of the external terminal 18 and the outer diameter of the shaft 16b of the internal terminal 16 is preferably between about 1.0 mm and about 5.0 mm. The boss 18b preferably has a radial thickness of between 0.5 mm and 2.0 mm inclusive. A material for the boss 18b is not limited to any particular material. The dimensions of the boss 18b, such as the protrusion length, inner diameter, and thickness of the boss 18b, are not limited to those illustrated herein.

The inventors conducted research using 1000 series aluminum (e.g., A1070) for the external terminal 18. The findings from the research have determined that if the shaft 16b of the internal terminal 16 has a diameter a1 (see FIG. 2) of 6 mm, the boss 18b of the external terminal 18 would be swaged to the shaft 16b of the internal terminal 16, as long as the boss 18b of the external terminal 18 has a height d1 (see FIG. 2) of between 4 mm and 13 mm inclusive and an inner diameter b1 (see FIG. 2) of 7 mm or more, and an average circumferential clearance c1 (see FIG. 2) between the shaft 16b of the internal terminal 16 and the boss 18b of the external terminal 18 is 0.5 mm or more.

On the basis of the findings, the inventors believe that the average circumferential clearance between the shaft 16b of the internal terminal 16 and the boss 18b of the external terminal 18 is preferably between about 0.5 mm and about 2.5 mm. In other words, the inventors believe that the difference between the inner diameter b1 of the boss 18b of the external terminal 18 and the diameter a1 of the shaft 16b of the internal terminal 16 is preferably between about 1 mm and about 5 mm. The clearance c1 between the boss 18b of the external terminal 18 and the shaft 16b of the internal terminal 16 is preferably such that the passage of the current X through the coil 40 enables collision of the boss 18b of the external terminal 18 with the shaft 16b of the internal terminal 16 so as to pressure-weld the boss 18b to the shaft 16b.

As described above, the present embodiment involves passing the current X through the coil 40 so as to deform the boss 18b of the external terminal 18 and thus pressure-weld the boss 18b to the shaft 16b of the internal terminal 16. Aluminum is used for the positive electrode internal terminal 16, and copper is used for the negative electrode internal terminal 16. Aluminum may be used for both of the positive electrode external terminal 18 and the negative electrode external terminal 18. If dissimilar metals are used for the internal terminal 16 and the external terminal 18 in this manner, the boss 18b of the external terminal 18 would be pressure-welded to the shaft 16b of the internal terminal 16. When the same type of metal is used for the positive electrode external terminal 18 and the negative electrode external terminal 18, welding of the external terminals 18 to a bus bar will not be dissimilar metal welding. This makes it likely that the external terminals 18 will be welded to the bus bar with high quality.

As illustrated in FIGS. 5 and 6, the internal terminal base 16a of the internal terminal 16 preferably includes a step 16a1 slightly rising from a portion of the internal terminal base 16a located around the shaft 16b. The step 16a1 is preferably forced into the gasket 21.

The gasket 21 may be provided with a recess 21c into which the internal terminal base 16a of the internal terminal 16 is to be fitted. The insulating member 22 may be provided with a recess 22b into which the external terminal base 18a of the external terminal 18 is to be fitted.

As illustrated in FIG. 4, the coil 40 is preferably disposed above the lid 32, with the insulator 60 interposed between the coil 40 and the lid 32. The coil 40 is preferably disposed around the boss 18b of the external terminal 18.

In one example, a method for manufacturing the battery 10 described above preferably includes the steps of: a) preparing a case component; b) preparing an internal terminal; c) preparing an external terminal; d) assembling the internal terminal to the case component; e) assembling the external terminal to the case component and the internal terminal; and f) performing pressure welding.

Step a) involves preparing the case component including the terminal insertion hole 12a. In the present embodiment, the case component is the lid 32.

Step b) involves preparing the internal terminal 16 including the internal terminal base 16a and the shaft 16b. The shaft 16b extends upward from the internal terminal base 16a. The shaft 16b is insertable through the terminal insertion hole 12a.

Step c) involves preparing the external terminal 18 including the external terminal base 18a and the boss 18b. The boss 18b extends upward from the external terminal base 18a. The boss 18b receives the shaft 16b therethrough.

Step d) involves assembling the internal terminal 16 to the lid 32 that is the case component. In step d), the shaft 16b is inserted through the terminal insertion hole 12a, with the gasket 21 (which is a component of the insulator 20) interposed between the lid 32 and the internal terminal base 16a. The internal terminal base 16a is disposed inside the lid 32.

Step e) involves fitting the boss 18b to the shaft 16b inserted through the terminal insertion hole 12a, with the insulating member 22 (which is a component of the insulator 20) interposed between the external terminal base 18a and the lid 32. In step e), the external terminal 18 is assembled to the case component and the internal terminal 16 such that the external terminal base 18a is located outside the lid 32.

Step f) involves disposing the coil 40 including an electric wire wound around the boss 18b. Step f) then involves passing a current through the coil 40 such that a radially inward force is exerted on the boss 18b so as to deform the boss 18b radially inward and pressure-weld the boss 18b to the shaft 16b of the internal terminal 16. In step f), the current passing through the coil 40 is preferably adjusted such that the boss 18b is forcibly deformed radially inward and pressure-welded to the shaft 16b of the internal terminal 16. In this case, the boss 18b is forcibly pressure-welded to the shaft 16b of the internal terminal 16, so that the boss 18b is connected to the shaft 16b of the internal terminal 16 on the same principle as electromagnetic welding. This provides conductivity of the connection between the boss 18b and the shaft 16b, making it unnecessary to perform any additional welding between the internal terminal 16 and the external terminal 18.

As illustrated in FIGS. 2 and 3, the internal terminal 16 is attachable to the case 12 (or more specifically, the lid 32) even after the electrode body 14 is attached to the internal terminal 16.

The method for pressure-welding the boss 18b of the external terminal 18 to the shaft 16b of the internal terminal 16 has been described above.

As a result of using this method, the shaft 16b of the internal terminal 16 may have a deformation mark of plastic deformation that axially pulls the shaft 16b toward the outside of the case 12. In this case, deformation may occur mainly in the base end of the shaft 16b.

Figure 7:
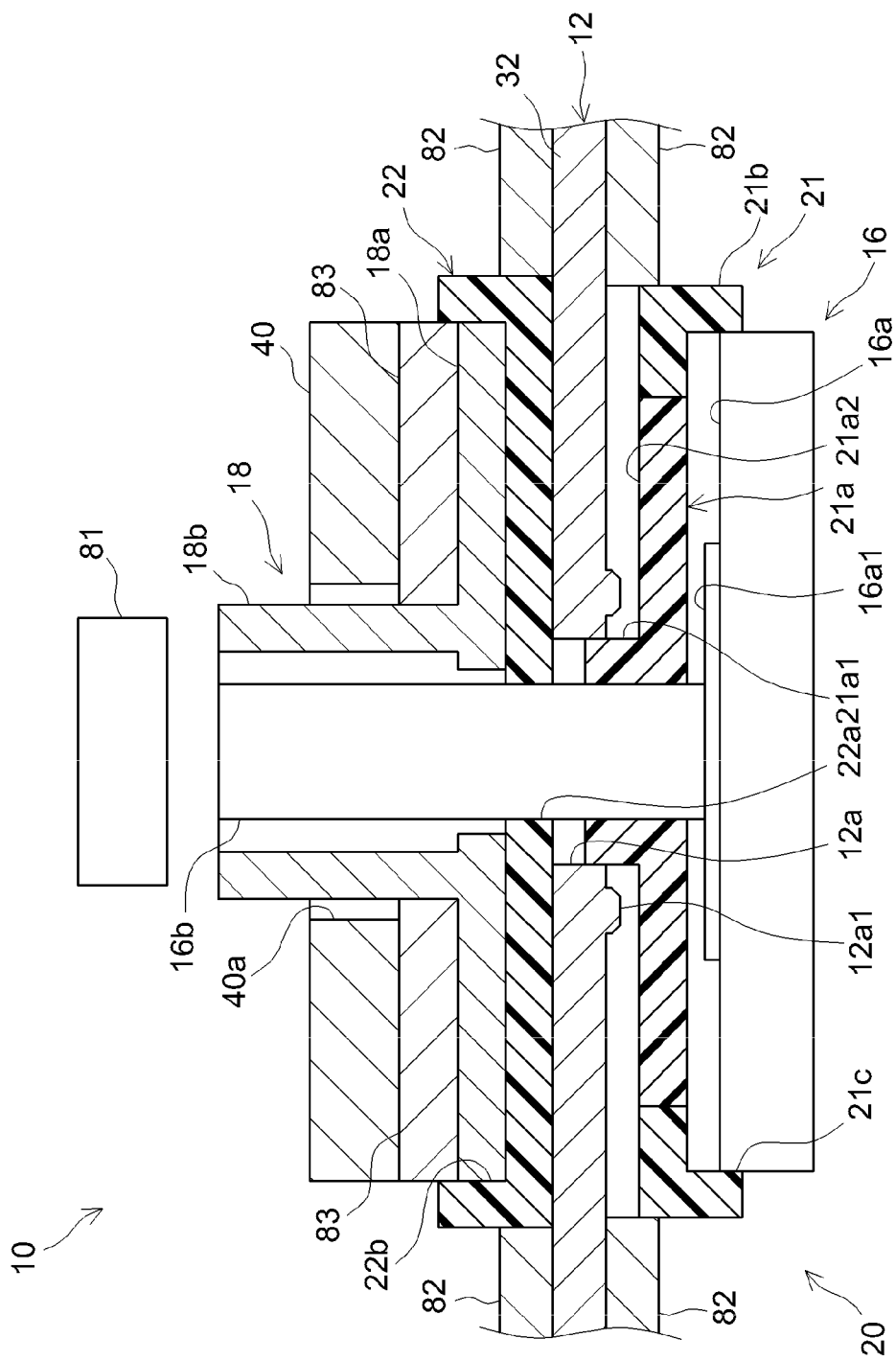
FIG. 7 is a schematic diagram of the terminal assembly of the battery 10, illustrating a variation of a manufacturing step for assembling the terminal assembly.

FIG. 7 is a schematic diagram of the terminal assembly of the battery 10, illustrating a variation of a manufacturing step for assembling the terminal assembly.

As illustrated in FIG. 7, the pressure welding step may involve disposing a first restrictor 81 to restrict excessive deformation of the shaft 16b. The first restrictor 81 may be disposed above the shaft 16b. This prevents excessive deformation of the shaft 16b of the internal terminal 16.

The pressure welding step may further involve disposing a second restrictor 82 to restrict excessive deformation of the gasket 21 and the insulating member 22 (which are components of the insulator 20). The second restrictor 82 may be disposed around the gasket 21 and the insulating member 22. In one example, the second restrictor 82 is preferably disposed in abutment with the peripheral edges of the gasket 21 and the insulating member 22. If the gasket 21 and/or the insulating member 22 are/is pressed and deformed, the second restrictor 82 would reduce the deformation of the gasket 21 and/or the insulating member 22.

The pressure welding step may further involve disposing a third restrictor 83 to restrict deformation of the external terminal base 18a of the external terminal 18. The third restrictor 83 may be disposed on the external terminal base 18a of the external terminal 18. The coil 40 (which is a one-turn coil) is preferably disposed on the third restrictor 83 such that the third restrictor 83 is pressed from above by the coil 40. This prevents or reduces upward deformation of the external terminal base 18a when the boss 18b of the external terminal 18 deforms. When necessary, the external terminal base 18a and/or a corner defined between the external terminal base 18a and the boss 18b may be provided with cut-out(s) so as to prevent or reduce deformation of the external terminal base 18a and/or the corner.

In one example, each of the first restrictor 81, the second restrictor 82, and the third restrictor 83 may be an insulator having required rigidity. The first restrictor 81, the second restrictor 82, and the third restrictor 83 have different functions. All of the first restrictor 81, the second restrictor 82, and the third restrictor 83 may be used. Alternatively, one or two of the first restrictor 81, the second restrictor 82, and the third restrictor 83 may be used.

When necessary, a magnetic force attenuation member may be disposed at a suitable location so as to adjust the magnetic field and thus adjust the forces to be exerted on the internal terminal 16 and the external terminal 18. In one example, the magnetic force attenuation member may be an iron plate or an electromagnetic steel plate.

Figure 8:
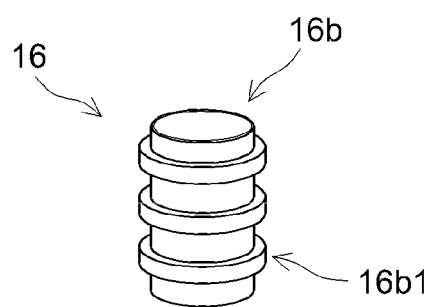
FIG. 8 is a schematic diagram illustrating a variation of a shaft 16b of an internal terminal 16.
Figure 9:
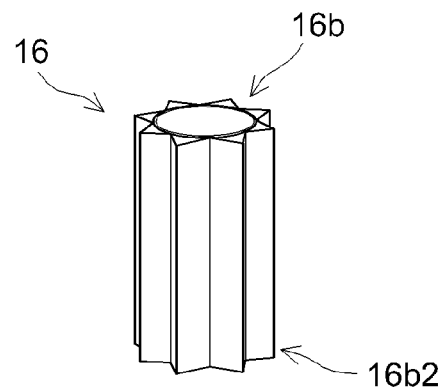
FIG. 9 is a schematic diagram illustrating another variation of the shaft 16b of the internal terminal 16.
Figure 10:
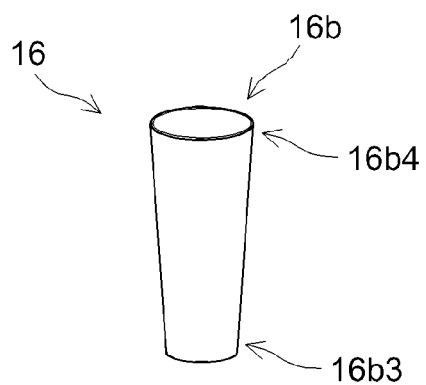
FIG. 10 is a schematic diagram illustrating still another variation of the shaft 16b of the internal terminal 16.

FIGS. 8, 9 and 10 are schematic diagrams each illustrating a variation of the shaft 16b of the internal terminal 16. Each of FIGS. 8, 9 and 10 illustrates the shape of the shaft 16b but does not illustrate an entirety of the internal terminal 16.

The outer peripheral surface of the shaft 16b may be provided with protrusions and recesses in order to strengthen the connection between the boss 18b of the external terminal 18 (see FIG. 5) and the shaft 16b of the internal terminal 16. As illustrated in FIG. 8, the outer peripheral surface of the shaft 16b may be provided with protrusions and recesses 16b1 extending in the circumferential direction of the internal terminal 16. The circumferentially extending protrusions and recesses 16b1 may be provided in layers in the axial direction of the shaft 16b of the internal terminal 16. In this example, the boss 18b of the external terminal 18, which has been deformed radially inward and pressure-welded to the shaft 16b of the internal terminal 16, is forced into the recesses extending in the circumferential direction of the internal terminal 16. This makes it unlikely that the boss 18b will be disengaged from the shaft 16b of the internal terminal 16 in the axial direction thereof. In this example, the protrusions and recesses 16b1 may be provided at intervals in the circumferential direction of the shaft 16b. Alternatively, the protrusions and recesses 16b1 may be provided spirally on the outer peripheral surface of the shaft 16b.

As illustrated in FIG. 9, the outer peripheral surface of the shaft 16b may be provided with protrusions and recesses 16b2 extending in the axial direction of the internal terminal 16. In this example, the protrusions and recesses 16b2 may be arranged in the circumferential direction of the shaft 16b. In this example, the boss 18b of the external terminal 18 (see FIG. 5), which has been deformed radially inward and pressure-welded to the shaft 16b of the internal terminal 16, is forced into the recesses extending in the axial direction of the shaft 16b of the internal terminal 16. This makes it unlikely that the boss 18b will be disengaged from the shaft 16b of the internal terminal 16. In this example, the protrusions and recesses 16b2 may be provided at intervals in the axial direction of the shaft 16b of the internal terminal 16.

As illustrated in FIG. 10, the shaft 16b may include a base end 16b3 and an end 16b4 larger in diameter than the base end 16b3. In this example, the boss 18b of the external terminal (see FIG. 5), which has been deformed radially inward and pressure-welded to the shaft 16b of the internal terminal 16, is forced into the base end 16b3 of the shaft 16b of the internal terminal 16. This makes it unlikely that the boss 18b will be disengaged from the shaft 16b of the internal terminal 16. As described above, the outer peripheral surface of the shaft 16b of the internal terminal 16 may be provided with protrusions and grooves when necessary such that the boss 18b is forced into the grooves.

Figure 11:
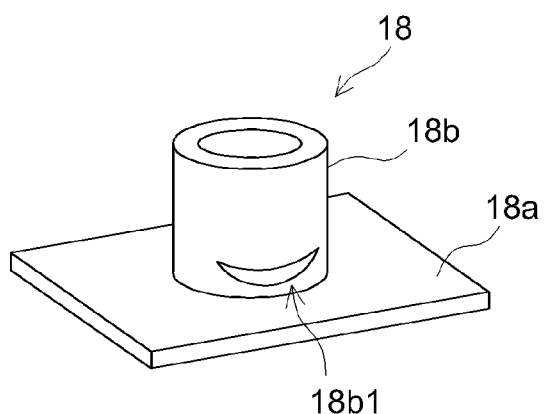
FIG. 11 is a schematic diagram illustrating a variation of an external terminal 18.
Figure 12:
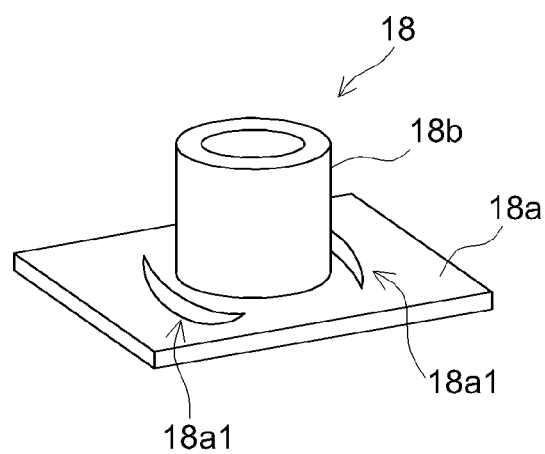
FIG. 12 is a schematic diagram illustrating another variation of the external terminal 18.

FIGS. 11 and 12 are schematic diagrams each illustrating a variation of the external terminal 18. As illustrated in FIG. 11, the boss 18b may be provided with a slit 18b1 extending in the circumferential direction of the boss 18b.

As illustrated in FIG. 12, the external terminal base 18a of the external terminal 18 may be provided with slits 18a1 extending around the boss 18b.

Providing the slit 18b1 as illustrated in FIG. 11 or providing the slits 18a1 as illustrated in FIG. 12 makes it unlikely that a large distortion will occur in the external terminal 18 when the boss 18b of the external terminal 18 is deformed radially inward and pressure-welded to the shaft 16b of the internal terminal 16. Providing such slits causes suitable deformation of the boss 18b so as to facilitate pressure-welding of the boss 18b to the shaft 16b of the internal terminal 16. From the viewpoint of reducing the distortion of the external terminal 18 during radially inward deformation and pressure-welding of the boss 18*b* of the external terminal 18, the slit 18*b*1 and/or the slits 18*a*1 are/is preferably suitably adjusted in width and length.

Various embodiments of the present disclosure have been described thus far. Unless otherwise specified, the embodiments of the present disclosure described herein do not limit the present invention.

The shapes of the components of the battery 10, such as the internal terminal 16, the external terminal 18, and the insulator 20, are not limited to the shapes illustrated in the drawings. Various changes may be made to the shapes of the components of the battery 10.

What is claimed is:

1. A battery comprising:
a case including a terminal insertion hole;
an electrode body housed in the case;
an internal terminal attached to the electrode body and mounted inside the case;
an external terminal disposed outside the case; and
at least one insulator disposed between the case and the internal terminal and between the case and the external terminal, wherein
the internal terminal includes
an internal terminal base disposed inside the case, with the insulator interposed between the internal terminal base and the case, and
a shaft extending from the internal terminal base, the shaft being disposed through the terminal insertion hole so that a portion of the shaft is disposed outside the case,
the external terminal includes
an external terminal base disposed outside the case, with the insulator interposed between the external terminal base and the case, and
a boss extending from the external terminal base, the boss receiving the shaft of the internal terminal therethrough, and
the boss is pressure-welded to the portion of the shaft of the internal terminal disposed outside the case, so that the boss is at least partially press-fitted to the shaft of the internal terminal, and atoms of the boss and the shaft are bonded to each other, wherein the boss is a tubular shaped protrusion that extends from the external terminal base in a direction away from the case.

2. The battery according to claim 1, wherein
the shaft of the internal terminal has a deformation mark of plastic deformation that axially pulls the shaft toward outside of the case.

3. The battery according to claim 1, wherein
an outer peripheral surface of the shaft is provided with protrusions and recesses.

4. The battery according to claim 1, wherein
the boss is provided with a slit extending in a circumferential direction of the boss.

5. The battery according to claim 1, wherein
the external terminal base is provided with a slit extending around the boss.

6. A battery manufacturing method comprising the steps of:
a) preparing a case component including a terminal insertion hole;
b) preparing an internal terminal including an internal terminal base and a shaft extending upward from the internal terminal base, the shaft being insertable through the terminal insertion hole;
c) preparing an external terminal including an external terminal base and a boss extending upward from the external terminal base, the boss being configured to receive the shaft therethrough, wherein the boss is a tubular shaped protrusion that extends from the external terminal base in a direction away from the case component;
d) assembling the internal terminal to the case component such that the shaft is inserted through the terminal insertion hole, with an insulator interposed between the case component and the internal terminal base, and the internal terminal base is disposed inside the case component;
e) assembling the external terminal to the case component and the internal terminal such that the boss is fitted to the shaft inserted through the terminal insertion hole, with the insulator interposed between the external terminal base and the case component, and the external terminal base is disposed outside the case component; and
f) performing pressure welding involving disposing a coil including an electric wire wound around the boss, and passing a current through the coil such that a radially inward force is exerted on the boss so as to deform the boss radially inward and pressure-weld the boss to the shaft of the internal terminal.

7. The battery manufacturing method according to claim 6, wherein
step f) involves passing the current through the coil, with the shaft pulled upward and the external terminal pressed downward.

8. The battery manufacturing method according to claim 6, wherein
step f) involves disposing a first restrictor to restrict deformation of the shaft, the first restrictor being disposed above the shaft.

9. The battery manufacturing method according to claim 6, wherein
step f) involves disposing a second restrictor to restrict deformation of the insulator, the second restrictor being disposed around the insulator.

10. The battery manufacturing method according to claim 6, wherein
step f) involves disposing a third restrictor to restrict deformation of the external terminal base, the third restrictor being disposed on the external terminal base.

* * * * *